(12) United States Patent
Williams

(10) Patent No.: US 7,792,718 B2
(45) Date of Patent: Sep. 7, 2010

(54) METHOD OF USING MARKET TECHNIQUES TO INCENTIVISE AND VALUE KNOWLEDGE BUILDING

(75) Inventor: Ralph Peter Williams, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 1571 days.

(21) Appl. No.: 10/961,217

(22) Filed: Oct. 12, 2004

(65) Prior Publication Data

US 2006/0100942 A1 May 11, 2006

(51) Int. Cl.
*G06Q 40/00* (2006.01)
(52) U.S. Cl. ............... 705/35; 705/36; 705/36 T; 705/39
(58) Field of Classification Search ............... None
See application file for complete search history.

(56) References Cited

U.S. PATENT DOCUMENTS

| | | | |
|---|---|---|---|
| 5,970,482 A | 10/1999 | Pham et al. | |
| 6,484,155 B1* | 11/2002 | Kiss et al. | 706/45 |
| 6,931,417 B2* | 8/2005 | Ueda | 707/102 |
| 7,003,502 B1* | 2/2006 | Wizdo et al. | 706/46 |
| 7,111,008 B2* | 9/2006 | Nomura et al. | 707/101 |
| 2002/0087496 A1* | 7/2002 | Stirpe et al. | 706/45 |
| 2002/0103777 A1 | 8/2002 | Zhang | |
| 2003/0061093 A1* | 3/2003 | Todd | 705/14 |
| 2003/0074331 A1 | 4/2003 | Kreft | |

* cited by examiner

*Primary Examiner*—Thomas Dixon
*Assistant Examiner*—Benjamin S Fields
(74) *Attorney, Agent, or Firm*—Sughrue Mion, PLLC

(57) ABSTRACT

A method for operating a knowledge market is disclosed. The method for operating the knowledge market includes creating a knowledge base with a plurality of knowledge assets. A strike value is assigned to each of the knowledge assets. An earned value is calculated for each of the knowledge assets based on the corresponding usage of the knowledge asset.

15 Claims, 8 Drawing Sheets

FIG. 2

| Calibration 210 | Possible Scale 1 - "Level of impact" 220 | Possible Scale 2 - "Scorecard" 230 | Possible Scale 3 - "Strategic Impact" 240 |
|---|---|---|---|
| 10 kvp | "High value" - knowledge assets that make a material difference to profitability, revenue, efficiency or some strategic directive. Might include client contact records, key process documents, implementation guides) | "Shareholder focused" - knowledge assets that directly and materially increase EVA or similar | "Strategic initiatives a, b and c" - knowledge assets that relate to these initiatives |
| 8 kvp | ("Moderate to high value") | "Customer-focused" - knowledge assets that directly and materially improve products or customer service | Null |
| 6 kvp | "Moderate value" - knowledge assets that are helpful but not essential. Might include earlier proposals, hints and tips, client deliverables) | "Process focused" - knowledge assets that directly and materially improve internal efficiency or effectiveness | "Strategic initiatives d and e" - knowledge assets that relate to these initiatives |
| 4 kvp | ("Low to moderate value") | "Staff focused" - knowledge assets that directly and materially improve the working community | Null |
| 2 kvp | "Low value" - knowledge assets that improve working conditions but are not important to any specific objective. Might include socially oriented material such as staff reviews of restaurants, etc) | "Community focused" - knowledge assets that directly and materially improve the standing of the company in the wider community. | Other - knowledge assets that relate to any other non strategic initiative |

|  | Level of Impact | | Replaceability | | Initial Strike Value |
|---|---|---|---|---|---|
|  | Rating | Value | Rating | Value |  |
| Asset 101 | Low to moderate | 4 | Impossible | 8 | 32 |
| Asset 102 | High | 10 | High | 6 | 60 |
| Asset 103 | Low | 2 | Low | 2 | 4 |
| Asset 104 | Moderate | 6 | Medium | 6 | 36 |
| Total |  |  |  |  | 132 |

| | Initial Strike Value | No. of hits | Usage earned value | "Highly valuable" ratings | "Somewhat valuable" ratings | Rating earned value | Total earned value |
|---|---|---|---|---|---|---|---|
| Asset 101 | 32 | 1 | -5 | 1 | 3 | 5 | 0 |
| Asset 102 | 60 | 13 | 0 | 2 | 2 | 6 | 6 |
| Asset 103 | 4 | 35 | 5 | 1 | 1 | 3 | 8 |
| Asset 104 | 36 | 51 | 10 | 3 | 1 | 7 | 17 |
| Total | | | | | | | 31 |

FIG. 5

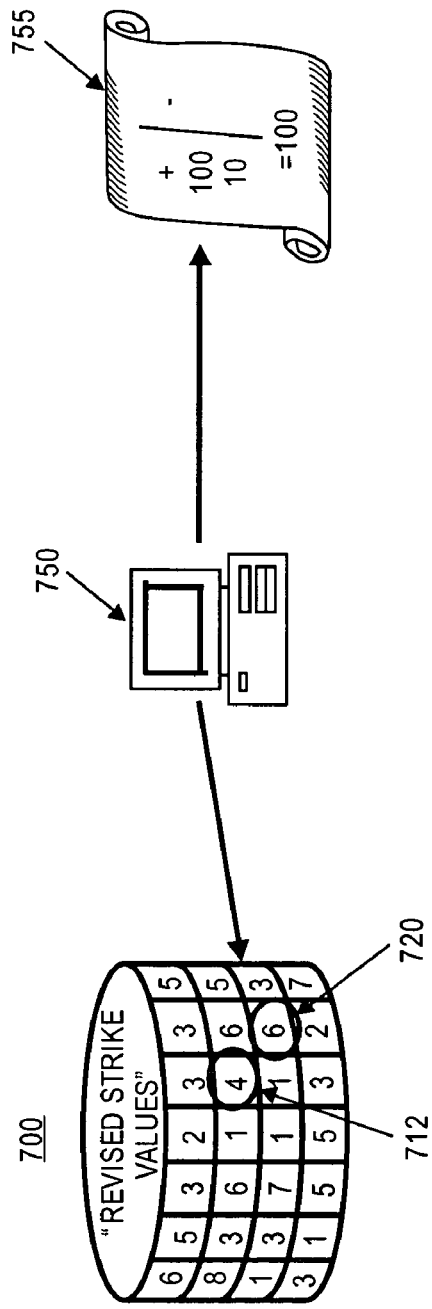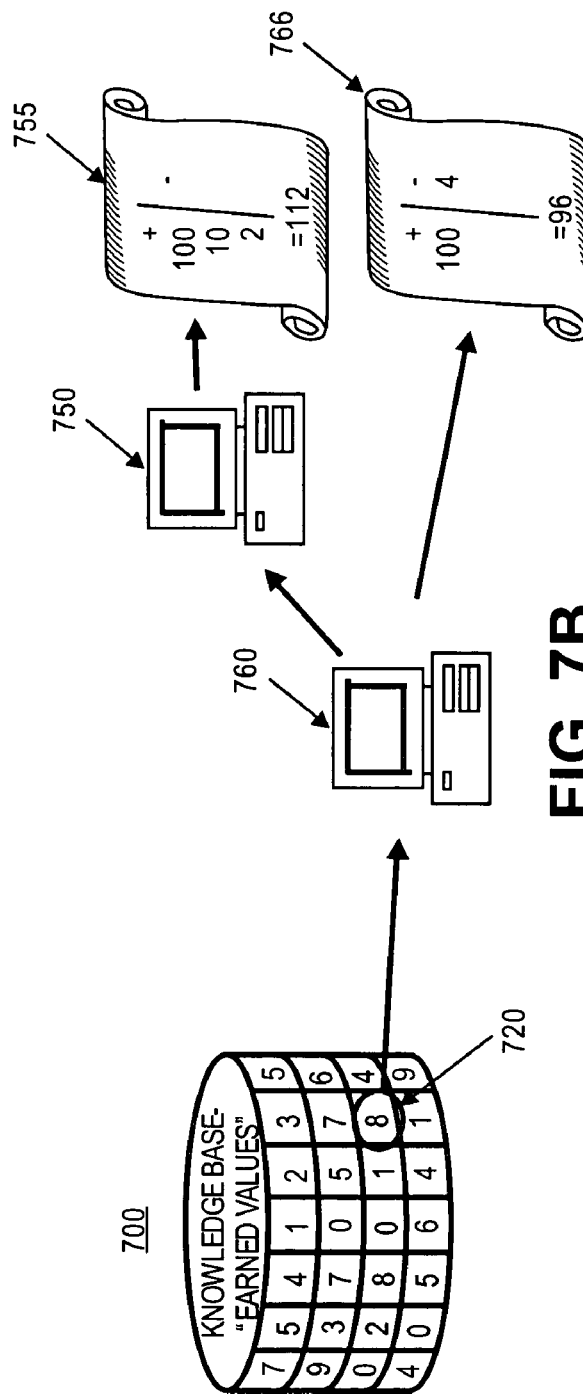

US 7,792,718 B2

METHOD OF USING MARKET TECHNIQUES TO INCENTIVISE AND VALUE KNOWLEDGE BUILDING

FIELD

The invention generally relates to knowledge building and, more particularly, to a knowledge market.

BACKGROUND

Businesses generally have an internal market for knowledge, such as sales information and technical knowledge. Many businesses are aware that this knowledge can be a competitive asset. Unfortunately, there is a lack of effective inventory systems that allow businesses to manage their knowledge. As a result, many businesses have been unable to measure the growth of and return on their knowledge assets. In addition, many businesses have to repeat or re-invent what they already know.

One problem with knowledge bases is determining a value for various knowledge assets. Since knowledge is an intangible concept, it is difficult to measure and value. Stock markets provide some guidance on how to value physical and intangible assets, such as a return on investment from an asset, or an asset's impact on growth. For example, a stock valuation of a business may even reflect the perceived value of that company's patent portfolio. Unfortunately, stock valuations fail to measure the return on knowledge assets, such as the knowledge assets used to build a patent portfolio. Stock markets offer little direct incentive or guidance on broader knowledge capture and management.

Accordingly, conventional knowledge bases typically focus on a small subset of knowledge, for example, a list of customers, or a patent portfolio. These, however, represent only a fraction of the knowledge assets that enable a business to function and succeed. Moreover, businesses are generally poor at capturing and leveraging knowledge, even where tools have been available to employees to capture and leverage knowledge, because no behavior incentive structure exists for the employees. Employees typically are also unaware of the costs and missed benefits of sharing knowledge assets.

Thus, there is a need to overcome these and other problems and to provide a knowledge asset management system and a method for managing knowledge assets.

SUMMARY

In accordance with an aspect of the invention, a method for operating a knowledge market comprises creating a knowledge base comprising a plurality of knowledge assets; assigning a strike value to each of the knowledge assets; and computing an earned value for each of the knowledge assets based on corresponding usage of each of the plurality of knowledge assets.

In accordance with another aspect of the invention, a method for operating a knowledge market comprises providing a knowledge base comprising a plurality of knowledge assets, wherein each of the plurality of knowledge assets includes a strike value; determining an earned value for each of the plurality of knowledge assets based on a corresponding usage of each of the plurality of knowledge assets; providing a plurality of knowledge accounts, wherein each of the plurality of knowledge accounts includes a balance; permitting each of the plurality of knowledge accounts to increase its balance by adding a new knowledge asset; and permitting each of the plurality of knowledge accounts to pay a portion of its balance to use the knowledge base.

In accordance with yet another aspect of the invention, a knowledge market comprises a plurality of knowledge assets and a plurality of knowledge accounts. Each of the plurality of knowledge assets comprises a strike value, and an earned value, wherein the earned value reflects usage of the knowledge asset. Each of the plurality of knowledge accounts includes a balance based on at least one of a strike value, a credit for adding at least one new knowledge asset, a debit for using at least one of the plurality of knowledge assets, and a credit for reviewing at least one of the plurality of knowledge assets.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention. In the drawings.

FIG. 2 shows exemplary scales that can be used to assign strike values in accordance with various embodiments of the invention;

FIG. 5 shows a method for calculating a return on knowledge assets in accordance with an exemplary embodiment of the invention;

FIG. 7A shows a method for crediting a knowledge account in accordance with an exemplary embodiment of the invention;

FIG. 7B shows a method for debiting a knowledge account in accordance with an exemplary embodiment of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration of exemplary embodiments in which the invention may be practiced. These embodiments are described in sufficient detail to enable those skilled in the art to practice the invention and it is to be understood that other embodiments may be utilized and that changes may be made without departing from the scope of the present invention. The following description is, therefore, not to be taken in a limited sense.

FIGS. 1-5 disclose knowledge markets and methods for operating knowledge markets in accordance with exemplary embodiments of the present invention. The knowledge markets can include, for example, knowledge assets each having a strike value, knowledge accounts each having a balance based on sharing and/or usage of knowledge, and rewards based on the balances.

Figure 1:
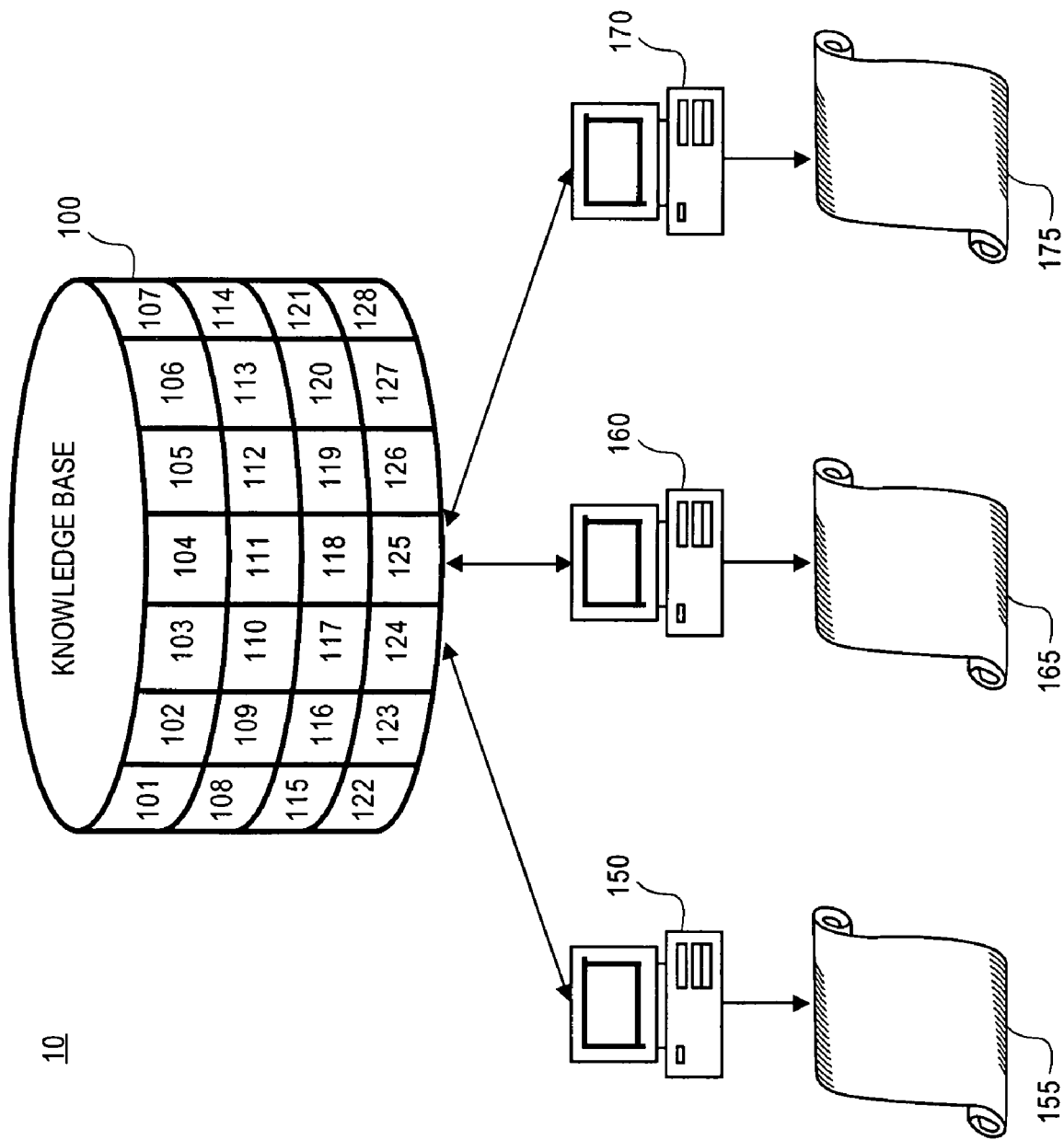
FIG. 1 shows a knowledge market that is consistent with an exemplary embodiment of the invention.

FIG. 1 shows an exemplary embodiment of a knowledge market 10 of an organization, such as, for example, a business. As used herein, the term, "organization" refers to a company, a business, and the like that have knowledge. Knowledge market 10 includes a knowledge base 100 comprising a plurality of knowledge asset 101-128, and a plurality of knowledge accounts 150, 160, and 170. Knowledge accounts 150, 160, and 170 can each have a corresponding balance 155, 165, and 175.

Knowledge base 100 can define a set of knowledge that forms the basis for a "knowledge market." As used herein, the term "knowledge market" refers to a system that renders the value of knowledge assets into a tangible form and tracks their value over time. By creating a knowledge market to value knowledge, an organization can track the value of its knowledge base, individual knowledge assets, categories, and subcategories of knowledge over time.

Knowledge base 100 can include a plurality of knowledge assets 101-128. Knowledge assets 100-128 can be any information that potentially has value to the organization, for example an organization's research reports, white papers, customer information, market surveys, and technical information. In various embodiments, knowledge assets 100-128 can be categorized, for example, into core areas and non-core areas based on the impact of knowledge assets to the organization's operation. Core areas can be, for example, new product designs, winning business, order fulfillment, and customer support. Non-core areas can be, for example, quality of work environment, internal efficiency, and staff morale. In various embodiments knowledge base 100 can further include sub-categories. One skilled in the art would understand that the types of knowledge assets used and valued by an organization will vary and that those disclosed herein are exemplary.

In some embodiments, knowledge assets 101-128 can each be assigned a value that is referred herein as a "strike value." The strike value of each knowledge asset can have a value based on, for example, an anticipated market demand for the knowledge asset. By analogy to an initial public offering (IPO) in the stock market, anticipated market demand can be driven by perceived long term value and uniqueness. The strike values of knowledge assets 101-128 can be calibrated on one or more scales selected by the organization. For example, the strike values can be derived by estimating the importance of each knowledge asset and multiplying that by a factor related to replaceability of the knowledge asset.

FIG. 2 shows several examples of scales that the organization can use to estimate importance: a level of impact scale 220; a scorecard 230; and a strategic impact 240. A calibration 210 can be derived by assigning values to each level of scales 220, 230, and 240. In some embodiments, the values begin at 2 points for the lowest level of the scales and increase to 10 points for the highest level. The scales and calibration showed in FIG. 2 are exemplary. One of skill in the art understands that other scales and calibration values can be used.

The scale for replaceability can be determined and calibrated by each organization. This can be done, for example, in terms of the average cost to create the knowledge assets. For example, one possible scale can assign a value of 8 points to knowledge assets that are impossible to replace, a value of 6 points for knowledge assets that have a high cost/effort to replace, a value of 4 points for knowledge assets that have a medium cost/effort to replace, and a value of 2 points for knowledge assets that have a low cost/effort to replace. One of ordinary skill in the art recognizes that other scales can be used and that is up to each organization to determine which scale best meets their needs.

Knowledge market 10 also includes a plurality of knowledge accounts 150, 160, and 170. Knowledge accounts can be set up for an individual within the organization and can be credited with points initially. As used herein, the term "individual" refers to a person, a team, or any group within the organization working together to achieve a common goal. The initial points allow the individual to begin using the knowledge account without having to first earn points. The accounts can also, for example, be credited with points at the beginning of each year. The knowledge accounts can provide incentive to the individual to take part in the knowledge market. As noted, each knowledge account 150, 160, and 170 can have a corresponding balance 155, 165, and 175. The balances show whether the individual contributes a new knowledge asset and/or uses a knowledge asset. Knowledge accounts 150, 160, and 170 can be credited when the individual contributes a new knowledge asset and debited when the individual uses one or more of knowledge assets 101-128.

Once usage of knowledge base 100 commences, each of the plurality of knowledge assets 101-128 can have an associated earned value. This earned value can reflect usage of the plurality of knowledge assets 101-128.

Figure 3:
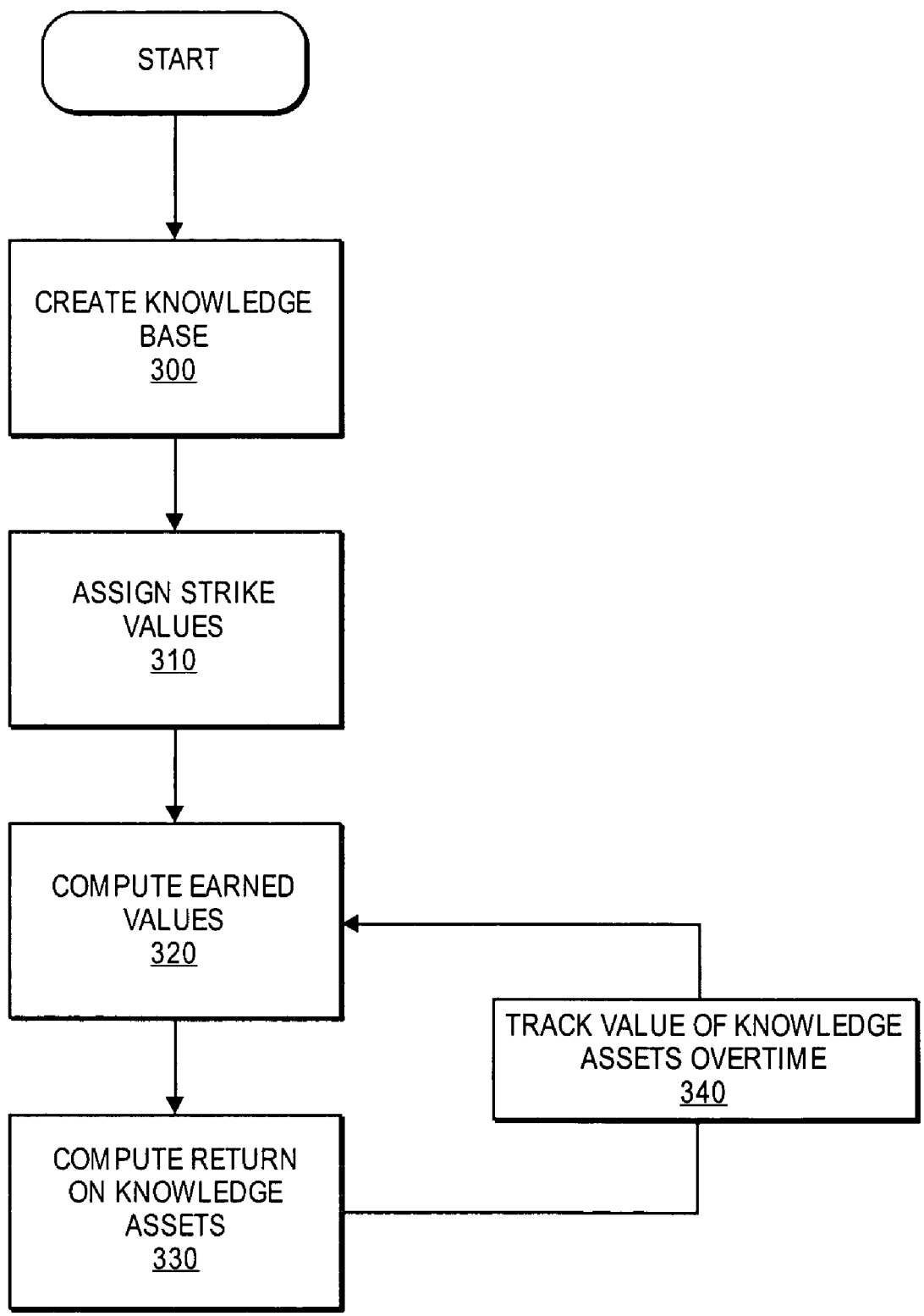
FIG. 3 shows a method for operating a knowledge market in accordance with an exemplary embodiment of the invention.

Referring now to FIG. 3, a method for operating a knowledge market according to various embodiments is shown. The knowledge market shown in FIG. 3 can represent a cycle of behavior for an organization. A knowledge base can be created in step 300 by selecting a set of content databases or documents that an organization wishes to track over time. For example, the content databases or documents can be implemented as knowledge assets 101-128. Knowledge assets 100-128 can be any information that potentially has value to the organization and can be categorized in a desired manner.

In step 310, initial strike values can be assigned to each of the knowledge assets. The initial strike values represent an organization's estimate of the value of the particular knowledge asset to the organization. For example, initial strike values can be assigned to an organization's knowledge assets by selecting an appropriate importance scale, and assigning a value to the knowledge asset by rating it on the selected scale. The knowledge asset's replaceability can then be estimated by rating it on a replaceability scale.

Figure 4:
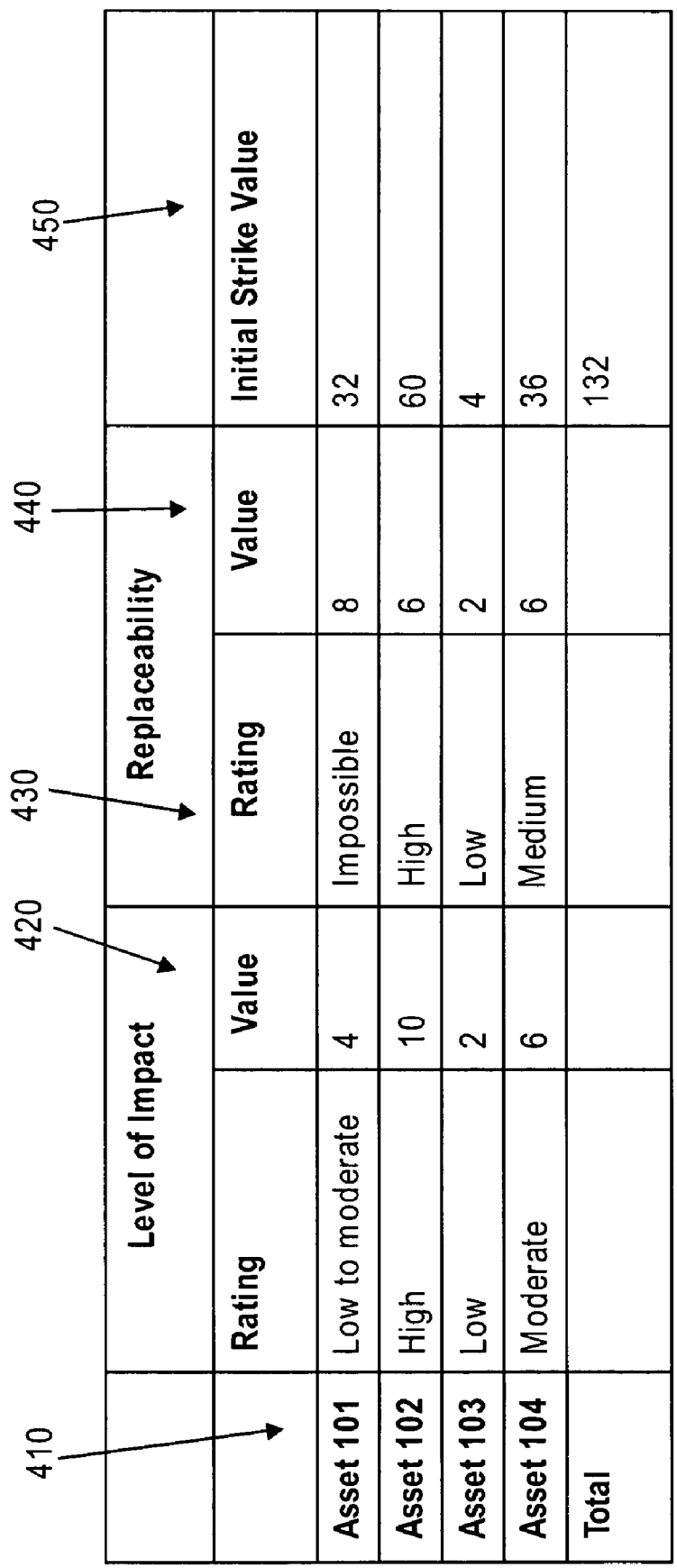
FIG. 4 shows a method for assigning strike values to knowledge assets in accordance with an exemplary embodiment of the invention.

An example of how initial strike values can be assigned to knowledge assets is shown in FIG. 4. As shown in FIG. 4, strike values can be assigned according to a table having columns 410, 420, 430, 440, and 450, which will now be described in more detail. An organization, choosing a level of impact scale, such as impact scale 220, can categorize knowledge assets on that scale. As shown, knowledge assets 101-104 in column 410 can be rated on the level of impact scale to provide a point value shown in column 420. Knowledge assets 101-104 can further be rated on a replaceability scale shown in column 430 to provide a point value shown in column 440. An initial strike value 450 can then be determined by multiplying the level of impact rating in column 420 of each knowledge asset by the replaceability ratings indicated in column 440. As with the stock market, initial strike values assigned to a knowledge asset may be somewhat arbitrary. The value of the knowledge asset, however, can increase or decrease as it is used. In this manner, the knowledge market can come to reflect the knowledge asset's value to the organization.

Referring now back to FIG. 3, once initial strike values are assigned, use of the knowledge base can begin and earned values can be calculated in step 320. In various embodiments, the earned value of a knowledge asset accumulates and/or declines based on usage. Earned value can comprise a usage earned value and a rating earned value. The usage earned value, as with initial strike values, can be calibrated on a scale determined by the organization. For example, usage earned value can be calibrated on a scale based on usage by a user population. The scale can, for example, deduct 5 points for less than 5% of the user population accessing the knowledge asset, award no points for 6-15% of the accessing the knowledge asset, award 5 points for 16-40% of the user population accessing the knowledge asset, award 10 points for 41-70% of the user population accessing the knowledge asset, award 15 points for 71-100% of the user population accessing the knowledge asset, and award 20 points for greater than 100% of the user population accessing the knowledge asset (taking into account repeat usage by the some users). One of ordinary skill in the art recognizes that other scales can be used and that is up to each organization to determine which scale best meets their needs.

In various embodiments, the earned value can also include a rating earned value based on user reviews of a knowledge asset. User reviews can validate an existing knowledge asset. For example, a knowledge asset would receive 2 points for a "highly valuable" review, 1 point for a "somewhat valuable" review, and 0 points for a "little or no value" review.

Earned values can then be calculated in step 320. One example of calculating such values may be illustrated by referring now to FIG. 5. As shown in FIG. 5, earned values can be calculated after month 1 for knowledge assets 101-104 in column 510. Column 520 shows the original strike values for knowledge assets 101-104. Column 530 shows the number of times each knowledge asset was accessed, also referred to as "hits." The usage earned value for each knowledge asset 101-104 shown in column 540 can then be calculated using, for example, the exemplary usage scale described above. Column 550 shows the number of "highly valuable" ratings and column 560 shows the number of "somewhat valuable" ratings. The rating earned value in column 570 can then be calculated for each knowledge asset 101-104 using the rating scale described above (e.g., 2 points for a "highly valuable" rating, and 1 point for a "somewhat valuable" rating). The earned value, shown in column 580, can then be calculated for each knowledge asset 101-104 by adding its usage earned value indicated in column 540 to its rating earned value indicated in column 570. In this example, calculation of earned values in column 570 can occur on a monthly basis. One of skill in the art understands, however, that earned value can be calculated over other time periods as desired by the organization, such as weekly or daily.

Referring now back to FIG. 3, processing proceeds to step 330 in which a return on knowledge assets can be calculated to track whether the knowledge base is adding more or less value over time. As explained above, a total earned value for the knowledge base can be calculated by summing the total earned value for each knowledge asset 101-104 shown in column 580. In an exemplary embodiment, the return on knowledge asset can be represented as a ratio of the total earned value to the strike value, in this case, 31/132=0.235.

A return on knowledge asset can also be calculated for individual knowledge assets 101-104. Referring to the example shown in FIG. 5, column 580 shows that asset 101 is adding little value after month 1. An organization can, for example, set a target return rate to identify knowledge assets to remove from the knowledge base. A reasonable period may be necessary, however, to allow for fluctuations that can arise as individuals of the organization respond to events and look for information that might assist them. Further, a return on knowledge assets can be calculated to track whether categories or sub-categories are adding more or less value over time.

In step 340, the value of the knowledge base, individual knowledge assets, categories, and sub-categories of knowledge assets can be tracked over time. To track value over time, steps 320-340 can be repeated periodically. For example, steps 320-340 can be repeated on a monthly basis as illustrated by the table shown in FIG. 4. One of skill in the art understands, however, that other time periods can be used by the organization.

New knowledge assets can also be added to the knowledge base after the knowledge base is created in step 310. When new knowledge assets are added to the existing knowledge base, strike values can be assigned to them in step 320. Because the knowledge market, like other markets, is an adaptive learning system, the accuracy of the strike valuation process can improve over time. For example, adaptation can occur where new knowledge assets added to the knowledge base are similar to those already there. When determining the strike value for the new knowledge assets, the earned value of the similar items over the past several months can be assessed. Thus, the present market value of the similar items can assist in determining the strike value of the new knowledge assets.

Figure 6:
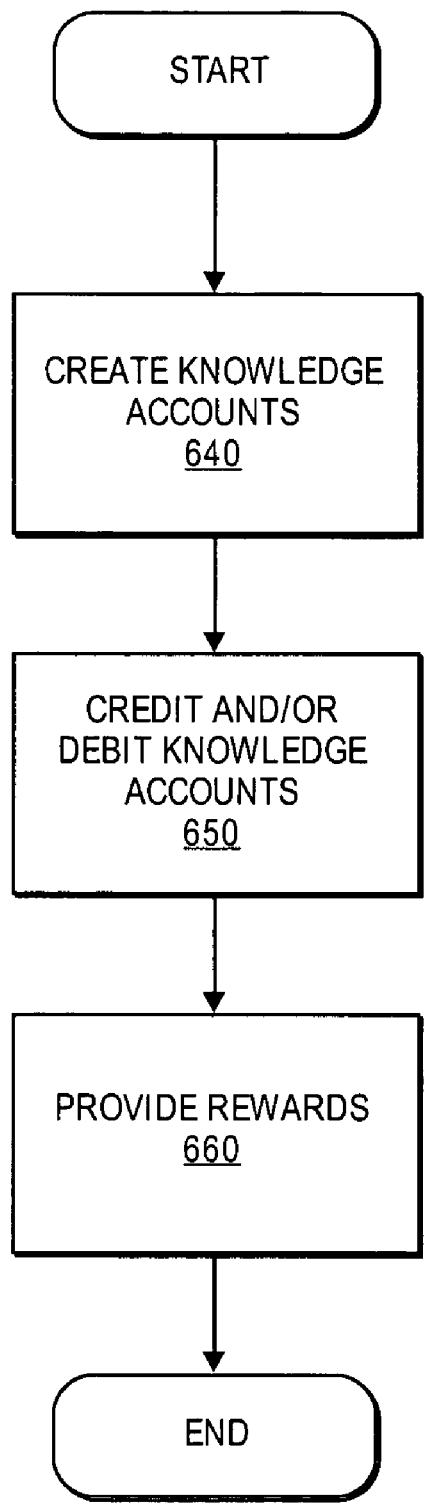
FIG. 6 shows a knowledge market that is consistent with an exemplary embodiment of the invention.

In some embodiments, incentives for individuals to take part in the knowledge market can be provided. FIG. 6 shows another exemplary embodiment of a knowledge market representing a cycle of behavior that encourages individuals to take part in the knowledge market. Referring to FIG. 6, in step 640, knowledge accounts can be created and assigned to individuals. These knowledge accounts can record whether the individual contributes a knowledge asset or uses a knowledge asset. As noted above, knowledge accounts 150, 160, and 170 can have corresponding balances 155, 165, and 175, respectively. Each account can be credited with, for example, 100 points when initially set up.

In step 650, knowledge accounts can then be credited or debited. Rules for crediting and debiting knowledge accounts can vary and organizations can implement rules as desired. Specific rules for crediting and debiting accounts are provided herein to explain operation of exemplary embodiments of the knowledge market and should not be considered limiting.

An example of crediting an account is shown with reference now to FIG. 7A. In FIG. 7A, an individual owning knowledge account 750 adds new knowledge assets 712 and 720 to a knowledge base 700. Knowledge assets 712 and 720 can have strike values of 4 and 6 points respectively. The balance 755 of knowledge account 750 can be credited with, for example, 10 points, equal to the strike value of the new knowledge assets. In various embodiments, balance 755 of knowledge account 750 could also be credited after each six month period with a royalty, for example, a percentage of the average monthly return on knowledge assets 712 and 720. This could continue for as long as knowledge assets 712 and 720 generate earned value. In this manner, the individual owner of account 750 would be encouraged to find new uses for knowledge assets 712 and 720 that they have placed in the knowledge base, either on their own or by bringing the knowledge asset to the attention of others.

Knowledge accounts can also be debited in step 650. An example of debiting a knowledge account is shown with reference now to FIG. 7B. In FIG. 7B, an individual owning knowledge account 760 uses knowledge asset 720 in knowledge base 700. Knowledge account 760 would receive a one time debit of, for example, 4 points. In the example shown in FIG. 7B, 2 points can represent 50% of the average monthly earned value over the previous six months or 50% of the strike value if no earned value has accumulated yet. The percentage of the debit can be less than the credit to encourage adding knowledge assets. In various embodiments, an individual's account with no points left can use knowledge assets and be overdrawn. In conjunction with account 760 being debited for using knowledge asset 720, knowledge account 750 can receive a royalty for adding knowledge asset 720 to knowledge base 700. For example, a percentage of knowledge asset 720's earned value or average monthly return on knowledge assets can be credited to knowledge account 750. Referring again to FIG. 7B, knowledge account 750 can receive a royalty of 2 points for knowledge account 760's use of knowledge asset 720.

Processing then flows to step 650, where, in various embodiments, credits for reviewing a knowledge asset can be provided. For example, a knowledge account that reviews a knowledge asset could receive 2 points for a "highly valuable" review, 1 point for a "somewhat valuable" review, and 0 points for a "little or no value" review. In various embodiments, points could be credited for reviews at two levels. At a basic level, users could receive points for simply clicking and providing a rating level. At a higher level, users could provide text on why they wanted to use a knowledge asset and what they found valuable about the knowledge asset. At this higher level, points could be credited, for example, for the amount of commentary provided.

In step 660, knowledge account balances can then be linked to rewards. The rewards can reflect the contribution of individuals to the knowledge base and could be awarded to knowledge accounts having more than a certain number of points at the end of each year. Rewards can be meaningful enough to encourage use of the knowledge market, but not so valuable as to distort behavior. Rewards can be, for example, cash prizes, tickets to an event, or stock options. Contribution to the knowledge base can also be a metric reviewed during an individual's performance appraisal.

Figure 8:
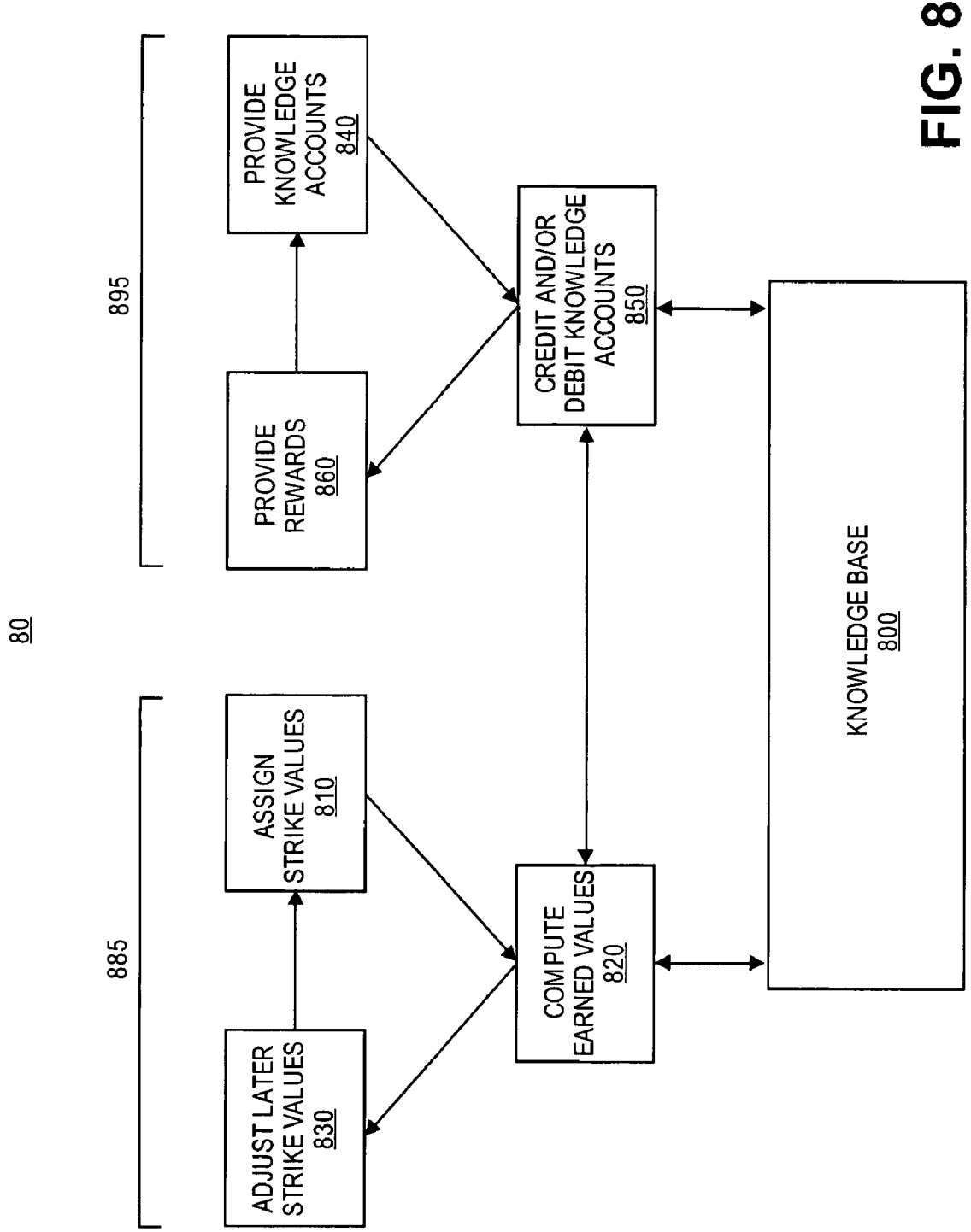
FIG. 8 shows another knowledge market that is consistent with an exemplary embodiment of the invention.

FIG. 8 shows another exemplary method for operating a knowledge market 80. As shown, knowledge market 80 can include a knowledge base 800 having a plurality of knowledge assets, an organization cycle of behavior 885, and an individual cycle of behavior 895. Individual cycle of behavior 895 includes providing a plurality of knowledge accounts 840 each having a balance. Each of the plurality of knowledge accounts can be owned by an individual or a team of an organization, as discussed above. As the individuals or teams use knowledge base 800, their knowledge accounts can be credited and debited in 850. Although examples of specific rules are provided herein, specific rules for crediting and debiting knowledge accounts can vary and will generally be determined by the organization. Generally, knowledge accounts can be debited for using one or more knowledge assets from knowledge base 800 and credited for adding one or more new knowledge assets to knowledge base 800. In various embodiments, knowledge accounts can also be credited for providing reviews of knowledge assets in knowledge base 800. At a time determined by the organization, for example, the end of the calendar year, knowledge account balances can be linked to rewards 860. Rewards and reward balances can vary and can be determined by the organization. In various embodiments, crediting and debiting knowledge accounts 850.

Organization cycle of behavior 895 includes assigning strike values in stage 810 to each of the knowledge assets as they become part of knowledge base 800. Specific criteria for assigning strike values can vary and will generally be determined by the organization. Generally, strike values for knowledge assets can be assigned based on perceived long term value and uniqueness. Examples of scales that can be used to calibrate criteria for assigning strike values are provided herein.

Earned values for the each of the plurality of knowledge assets can be computed in stage 820 at specified time periods, for example, monthly. The calculated earned values quantify the usage of the corresponding knowledge asset and, thus, an indication of the value of the knowledge asset. As with strike values, calibration of the earned values can be determined by the organization. Examples of scales that can be used to calibrate earned value are provided herein. In various embodiments, calculation of earned values computed in stage 820 can include determination of a return on knowledge assets for knowledge base 800 as a whole. A return of knowledge assets can also be determined for categories and/or sub-categories of knowledge assets.

In stage 830, the strike value and earned value of similar knowledge assets can be used to assign strike values for new knowledge assets as they are added to knowledge base 800. In this manner, knowledge market 80 provides feedback and improves the strike valuation process over time.

Operating together, individual cycle of behavior 885 and organization cycle of behavior 895 can demonstrate the value of knowledge base 800 by tracking relative measures, such as, for example, the return on knowledge asset. Moreover, knowledge market 80 can render tangible knowledge accumulation through attribution of strike values and earned values, while also providing behavioral cues and incentives for individuals to add and use knowledge assets of the organization.

According to various embodiments, an organization can provide management arrangements to permit a knowledge market to operate with low manual and systems overhead. Referring again to FIG. 8, manual overhead can include, for example, an oversight committee to run knowledge market 80. The oversight committee can manually assign strike values in stage 810, report on earned value and return on knowledge assets calculated in stage 820, and oversee operation of the knowledge accounts in the individual cycle of behavior cycle 895.

Systems support can be implemented by using portions of knowledge management systems known to one of ordinary skill in the art and, in various embodiments, by modifying the functionality of those portions. [Can you provide some specific examples of knowledge management systems?] System support for creating knowledge base 800 can include support for classifying knowledge assets, attributing knowledge assets to categories, and recording the knowledge asset type and author. System support for assigning strike values 810 can include recording assigned strike values and proposing strike values for new knowledge assets where the strike values are based on subject area or asset type.

System support for computing earned value in stage 820 can include the ability to record usage of knowledge assets and automatically determine earned value for those knowledge assets. This can include, for example, which knowledge assets are accessed and who accessed them. In various embodiments, system support for computing earned value in stage 820 can distinguish between an individual browsing a knowledge asset and an individual accessing the knowledge asset. System support for computing earned value in stage 820 can further include functionality to automatically calculate earned value and return on knowledge assets.

System support for computing earned value in stage 820 can also include functionality to permit reviews of knowledge assets. For example, radio buttons can be provided to allow individuals to review the value of a knowledge asset and provide a comment field for elaboration. The system support can further automatically maintain an average of score reviews and automatically add earned value.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered exemplary only.

What is claimed is:

1. A method for operating a knowledge market comprising: creating a knowledge base comprising a plurality of knowledge assets; assigning a strike value to each of the knowledge assets; and computing, by a processor, an earned value for each of the knowledge assets based on corresponding usage of each of the plurality of knowledge assets, wherein the assigning the strike value to each of the knowledge assets occurs before use of the knowledge asset, and wherein the strike value is determined for each of the plurality of knowledge assets using an estimate of importance of the knowledge asset and an estimate of replaceability of the knowledge asset.

2. The method of claim 1, further comprising creating a plurality of knowledge accounts, wherein each of the knowledge accounts includes a balance capable of being credited and debited.

3. The method of claim 2, further comprising crediting the balance of each knowledge account of the plurality of knowledge accounts that adds a new knowledge asset to the knowledge base.

4. The method of claim 2, further comprising debiting the balance of each knowledge account of the plurality of knowledge accounts that uses at least one knowledge asset of the plurality of knowledge assets.

5. The method of claim 2, further comprising crediting the balance of each knowledge account of the plurality of knowledge accounts that reviews at least one knowledge asset of the plurality of knowledge assets.

6. The method of claim 1, further comprising periodically computing a return on knowledge assets, wherein the return on knowledge assets equals the sum of strike values of the plurality of knowledge assets divided by the sum of the earned value of the plurality of knowledge assets.

7. The method of claim 1, further comprising periodically computing a return on knowledge asset for each of the plurality of knowledge assets, wherein the return on knowledge asset for each of the plurality of knowledge assets equals its strike value divided by its earned value.

8. The method of claim 1, further comprising adjusting the strike value of a new knowledge asset based on the earned value of a similar knowledge asset from the plurality of knowledge assets.

9. A method for operating a knowledge market comprising: providing a knowledge base comprising a plurality of knowledge assets, wherein each of the plurality of knowledge assets includes a strike value; determining by a processor, an earned value for each of the plurality of knowledge assets based on a corresponding usage of each of the plurality of knowledge assets; providing a plurality of knowledge accounts, wherein each of the plurality of knowledge accounts includes a balance; permitting each of the plurality of knowledge accounts to increase its balance by adding a new knowledge asset; and permitting each of the plurality of knowledge accounts to pay a portion of its balance to use the knowledge base wherein the strike value is determined for each of the plurality of knowledge assets before use of the knowledge asset using an estimate of importance of the knowledge asset and an estimate of replaceability of the knowledge asset.

10. The method of claim 9, further comprising permitting each of the plurality of knowledge accounts to increase its balance by reviewing one or more of the plurality of knowledge asset in the knowledge base.

11. The method of claim 9, further comprising rewarding a portion of the knowledge accounts, wherein the balance of each of the portion of knowledge accounts is equal to or greater than a threshold value.

12. The method of claim 9, wherein the step of adjusting the strike value for each of the plurality of knowledge assets based on its earned value occurs periodically.

13. The method of claim 9, further comprising periodically computing a return on knowledge assets, wherein the return on knowledge assets equals a sum of the strike values of the plurality of knowledge assets divided by the sum of the earned values of the plurality of knowledge assets.

14. The method of claim 9, further comprising periodically computing a return on knowledge asset for each of the plurality of knowledge assets by dividing the strike value of each of the plurality of knowledge assets by its earned value.

15. The method of claim 1, wherein the estimate of the importance of the knowledge asset is determined using at least one of a level of impact rating, a strategic impact rating, and a scorecard rating.

* * * * *